No. 669,214. Patented Mar. 5, 1901.
H. GEISE.
HOSE CONDUIT FOR RAILWAYS.
(Application filed Dec. 27, 1900.)
(No Model.)

Witnesses.
Chas. K. Bennett
Jno. T. Cross

Inventor,
Henry Geise,
by  his Attorney.

UNITED STATES PATENT OFFICE.

HENRY GEISE, OF PHILADELPHIA, PENNSYLVANIA.

HOSE-CONDUIT FOR RAILWAYS.

SPECIFICATION forming part of Letters Patent No. 669,214, dated March 5, 1901.

Application filed December 27, 1900. Serial No. 41,202. (No model.)

*To all whom it may concern:*

Be it known that I, HENRY GEISE, a citizen of the United States, and a resident of the city of Philadelphia, State of Pennsylvania, have invented certain new and useful Improvements in Hose-Conduits for Railways, of which the following is a full, clear, and exact description, reference being had to the accompanying drawings, forming part of this specification.

This invention relates to certain improvements in fire-hose conduits for crossing railways.

One object of my said invention is to provide an improved form of conduit adapted to extend under the car-tracks, so as to furnish a transit for fire-hose from one side of the street to the other without in any way interrupting the traffic.

A further object of the invention is to provide a conduit of such a construction that the hose may be readily and quickly inserted and passed therethrough without any danger of its being interrupted by the twisting of the hose, the shape of the conduit being such as to deflect and guide the hose during its passage through the said conduit.

A still further object is to simplify and cheapen the construction of the device, and thereby reduce the cost of laying the same.

The main points of novelty will be hereinafter fully described, and particularly pointed out in the claims made hereto.

Figure 1:
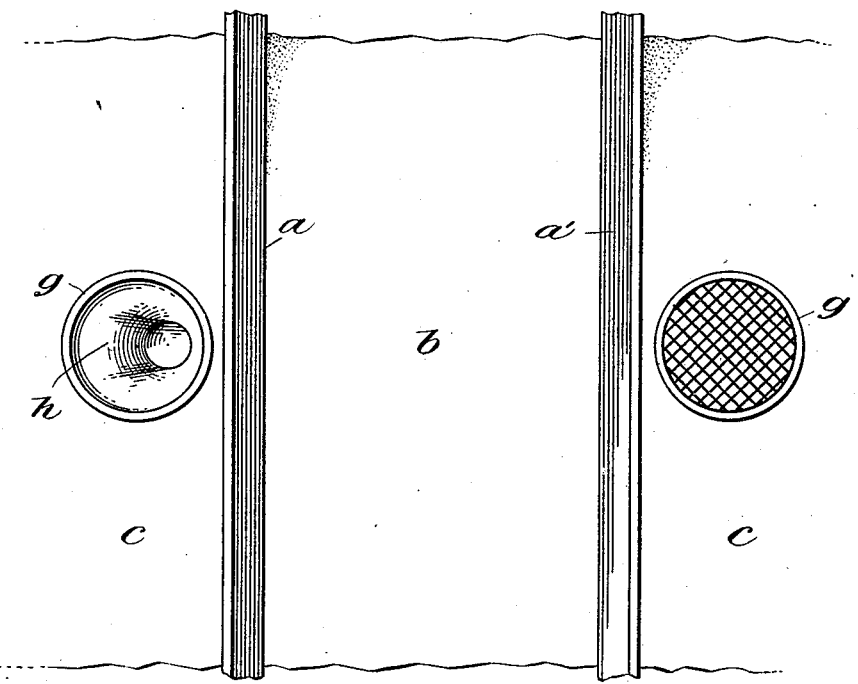
Figure 2:
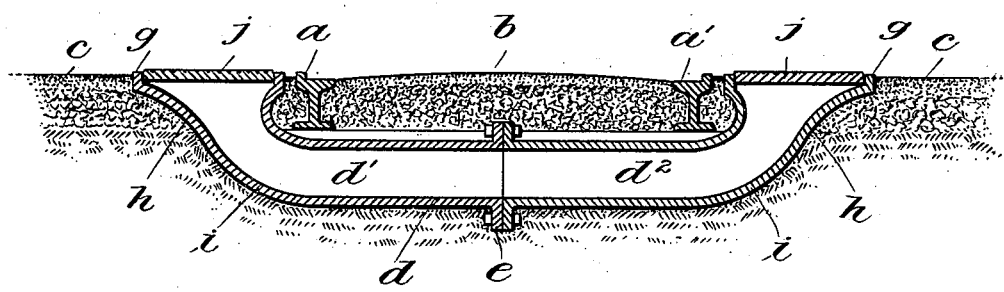

Referring to the accompanying drawings, Figure 1 is a plan view of a section of a street, showing the ends of the conduit and the coverings therefor. Fig. 2 is a longitudinal section through the conduit, showing the road-bed in cross-section.

In the said drawings, $a$ and $a'$ designate the track-rails, $b$ the road-bed, and $c$ the street. The conduit $d$ is preferably made of cast-iron and in two sections, as $d'$ and $d^2$, having the flanges $e$ formed on their meeting ends, which flanges are bolted together. Each end of the conduit $d$ is curved upwardly, as shown in Fig. 2 of the drawings, and terminates in an enlarged mouth having an annular flange $g$. The lower wall of the conduit adjacent each mouth is curved outwardly, as at $h$, thus forming a deflecting-wall at each opening, which serves to guide the hose down into the conduit when inserting the same, and the curved portion $i$, which is immediately adjacent to the portion $h$, serves to guide it upwardly and out of the opposite or outlet mouth.

Each opening or mouth is provided with a covering-plate $j$, which fits neatly inside of the flanges $g$ and is flush with the street-bed.

The simplicity of my construction will be readily understood from the foregoing description, and the advantages to be derived by the shape of the openings will also be readily seen. When the hose is inserted through one of the openings, the flaring walls of the conduit will serve to guide the same through said conduit, and the size of the conduit being only slightly larger than the hose prevents any possibility of clogging by the twisting of said hose. The opposite or outlet end of the conduit is so shaped as to guide the hose upwardly and out through the mouth of the same, there being no angles or obstructions to impede its passage.

I am aware that it is not new to provide conduits under railway-tracks for the passage of fire-hose, such a device being shown in my United States Patent No. 351,371, granted October 26, 1886, and I do not desire to claim the same broadly, but simply confine myself to the specific construction such as set forth in my claims.

Having thus described my invention, what I claim, and desire to secure by Letters Patent, is—

1. A fire-hose conduit for railway-tracks comprising a tubular pipe, $d$, constructed in two sections and bolted together at their meeting edges, upwardly-curved ends, $i$, provided in said pipe, and an enlarged flaring mouth for each outlet having the curved walls, $h$, for deflecting and guiding the hose during its insertion, substantially as described.

2. A fire-hose conduit for railway-tracks comprising a tubular pipe $d$, constructed in two sections and bolted together at their meeting edges, upwardly-curved ends, $i$, provided in said pipe, an enlarged flaring mouth for each outlet having the curved walls, $h$, for deflecting and guiding the hose during its insertion, an annular flange provided around each mouth and covers adapted to fit into and close the same, substantially as described.

In witness whereof I have hereunto set my hand this 24th day of December, A. D. 1900.

HENRY GEISE.

Witnesses:
CHARLES H. SPECKMAN,
JNO. T. CROSS.